3,538,576
METHOD OF CONVERTING A BRASS VALVE INTO A CRYOGENIC VALVE
Frank T. Saving, New Albany, Ind., assignor to Saving Machine & Supply Company, Louisville, Ky., a corporation of Kentucky
Filed July 22, 1968, Ser. No. 746,581
Int. Cl. B21d *53/00;* B21k *29/00;* B23p *15/26*
U.S. Cl. 29—157.1                                   6 Claims

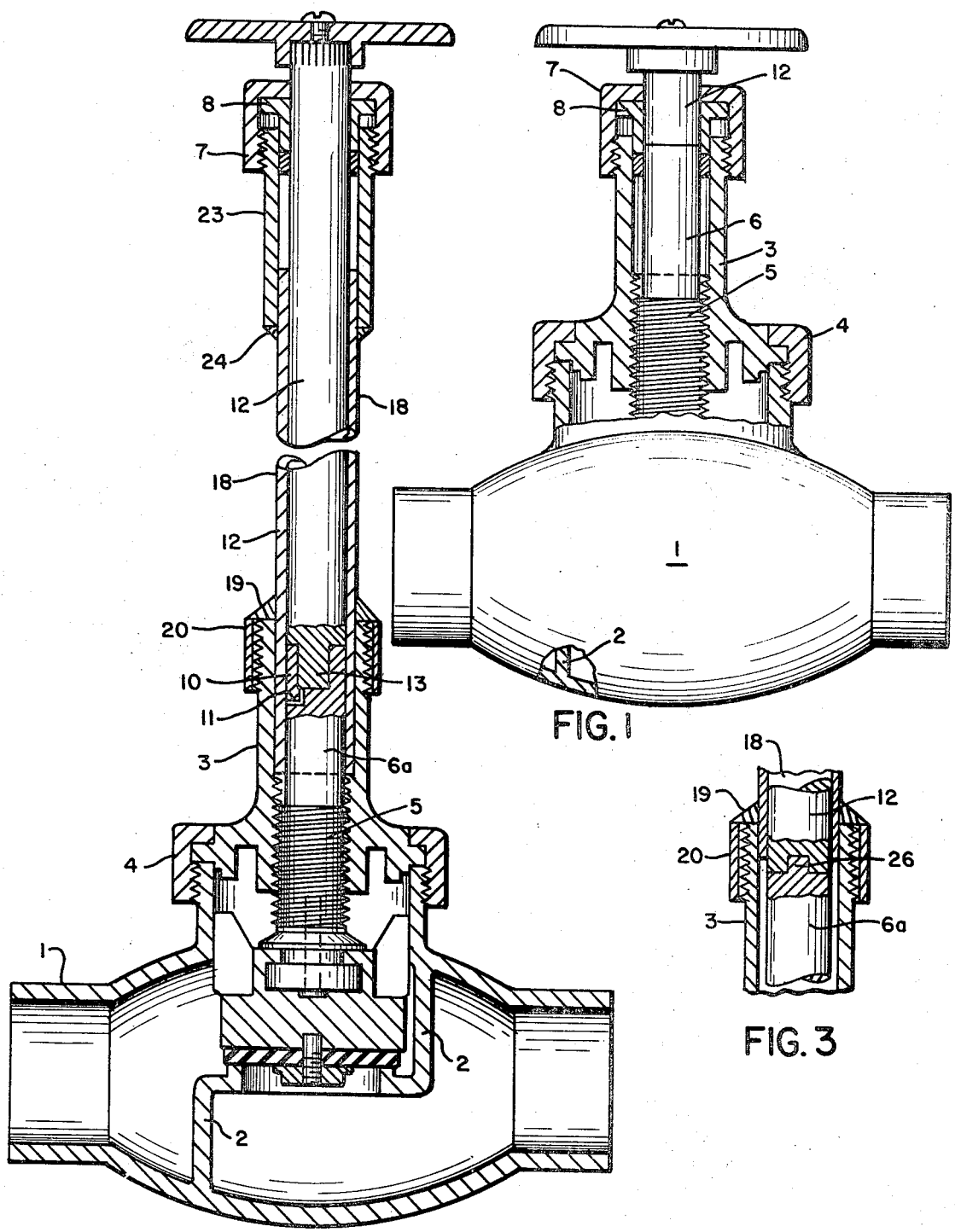

ABSTRACT OF THE DISCLOSURE

The conversion is effected, after removing the packing nut and ring of the brass valve, by severing the projecting brass valve stem at a point adjacent the open mouth of the brass valve bonnet; extending the brass stem remnant with a stainless steel rod of the same diameter and of desired length; extending the brass bonnet with a desired length of stainless steel tubing having one end snugly-fitted into one end of the bonnet and its other end snugly-fitted into one end of a brass adapter, the other end of which reproduces the mouth end of the original bonnet; and conventionally sealing the space between the adapter and the stainless rod using the original brass packing ring and nut.

BACKGROUND OF THE INVENTION

Field of the invention

The invention relates to the art of converting a brass pressure-rated valve, such as gate or globe valve, into a cryogenic valve by providing the stem and bonnet of the brass valve with a stainless steel extension. More particularly, the invention resides in an improved method for effecting the conversion after removing the brass packing nut and ring of the original brass valve.

Description of the prior art

A brass valve, such as gate or globe valve, essentially comprises: a hollow stationary brass valve body containing a valve opening and a bonnet; a movable brass valve-stem assembly having an inner cross-sectionally large valve-end portion for opening and closing the valve and an outer cross-sectionally smaller stem-end portion projecting outwardly from the bonnet of the valve; and a brass nut and packing ring for sealing the space at the mouth of the bonnet around the adjacent portion of the stem.

In converting such brass valves into cryogenic valves, it has been proposed to replace the entire brass valve-stem assembly by providing a single stainless steel rod of requisite length and uniformly large diameter and by machining it throughout its length to reproduce its cross-sectionally large valve-end portion and its cross-sectionally smaller stem-end portion. This method involved the waste of stainless steel which is very expensive and the machining of stainless steel which is difficult. It has also been proposed to cut off the original valve stem at a point adjacent the mouth of the bonnet and then extend it to a desired length through the use of stainless steel tube. This has not been satisfactory because the stainless steel tube, when turned to operate the valve, will twist at a torque which is too low for the valve to function properly.

SUMMARY OF THE INVENTION

Objects of the invention

The principal objects of this invention are: to provide an improved method for effecting the conversion; to reduce the conversion cost; and to improve the quality of the conversion product.

Statement of the invention

The principal objects of this invention are achieved and the conversion is effected after removing the packing nut and ring of the brass valve, by severing the projecting brass valve stem at a point adjacent the mouth of the brass valve bonnet; extending the brass stem remnant by rigidly securing thereto a stainless steel rod of the same diameter and of desired length; extending the brass bonnet by inserting into its mouth and rigidly securing one end of a snugly-fitting stainless steel tube of desired length the other end of which carries a rigidly secured snugly-surrounding brass adapter reproducing the mouth end of the bonnet; and sealing the space betwen the adapter and the stainless rod with the original brass packing ring and nut.

BRIEF DESCRIPTION OF THE DRAWINGS

The invention is illustrated in the accompanying drawing wherein:

FIG. 1 is a section taken longitudinally through a globe valve of conventional construction, which is to be converted;

FIG. 2 is a section taken longitudinally through the globe valve of FIG. 1 after it has been converted in accordance with the invention; and FIG. 3 is a fragmentary view showing a modified mortise-tenon joint in the valve stem assembly.

CONVENTIONAL GLOBE VALVE STRUCTURE

The conventional brass globe valve shown in FIG. 1 comprises: a hollow stationary brass valve body 1 containing a partition 2, which presents a valve seat opening midway between pipe-receiving openings at opposite ends of the valve body, and having a bonnet 3, which is secured to the valve body by a bonnet ring 4; a movable brass valve-stem assembly having an inner (cross-sectionally large) valve end portion 5 threaded to the bonnet for opening and closing the valve seat opening and a cross-sectionally smaller stem 6 projecting from the threads of 5 outwardly beyond the mouth of the valve bonnet 3; and a brass packing nut 7 and packing ring 8 at the mouth of the bonnet 3 for use in sealing the packing space between the bonnet and the adjacent outer end portion of the stem 6.

The packing nut and ring 7, 8 are removed at the outset of my conversion method.

DESCRIPTION OF THE PREFERRED EMBODIMENT

My presently preferred method of converting the globe valve of FIG. 1 into the cryogenic valve of FIG. 2 may be described as a four step method comprising: severing the valve stem; extending the stem remnant; extending the bonnet; and then sealing the packing space at the bonnet end of the extended valve.

Severing the stem

The projecting brass valve stem 6 preferably may be severed by any suitable means at any suitable point. Preferably, it is severed at a point adjacent the mouth of the brass bonnet 3, leaving a remnant 6a within the bonnet.

Extending the stem

The brass valve stem remnant 6a is extended, in accordance with my invention, by providing the stem remnant with one element and a stem extension with the other element of a "mortise-tenon" joint; and then assembling and securing the mortise and tenon ends of the brass stem and stainless steel extension together.

Accordingly, in the arrangement illustrated, an axially extending "cylindrical mortise" 10 is drilled through the end face of the brass stem remnant 6a. The remnant 6a is additionally drilled to provide an inspection or observation passageway 11 extending from the inner (or bottom) end of the mortise 10 to the periphery of the brass stem remnant 6a. Next, I provide a valve stem extension 12, in the form of a solid stainless steel rod of requisite length. Between ends, the solid extension rod 12 has an outside diameter (OD) corresponding to the OD of the brass stem remnant 6a. The extension 12 has its inner end reduced to form a closely fitting tenon 13 for the bore of the cylindrical brass stem mortise 10, while its outer end is peripherally corrugated to receive the valve operating wheel and axially drilled and threaded to receive the retaining screw for the valve operating wheel. Finally, the mortise and tenon ends of the brass stem remnant 6a and the stainless steel extension 12 are operatively assembled and then rigidly secured together by a silver soldering operation or its equivalent.

In performing the silver soldering operation on the stem, the solder is conventionally fed into the mortise-tenon joint at a location corresponding to the outer or open end of the cylindrical mortise. A joint of high quality and strength can normally be produced by continuing to feed solder until it passes entirely through both the mortise 10 and the inspection or observation passageway 11 so as to appear at the opening of that passageway on the periphery of the stem remnant 6a.

Extending the bonnet

In extending the brass valve bonnet 3, I provide a bonnet extension 18 in the form of a stainless steel tube 18 of requisite length and of an OD corresponding to the inside diameter (ID) of the brass bonnet 3, insert one end of the stainless tube 18 into a snug fit with the bore at the open end of the bonnet 3 and suitably secure them rigidly together. Preferably, the bonnet 3 and extension 18 are silver soldered together as indicated at 19.

The foregoing mode of extending the brass valve bonnet 3 leaves its external bonnet-ring-receiving threads fully exposed. This is not normally objectionable from any functional standpoint. However, it may be objectionable from an appearance standpoint. In such case, it is a simple matter to conceal the ring-receiving threads by enclosing them with a closely fitting band 20 composed of stainless steel or any other suitable metal and to silver solder that band 20 in place during the operation of soldering the extension tube 18 to the bonnet 3.

In completing the extension of the bonnet, I provide an externally-threaded brass bonnet adapter 23, having an ID corresponding to the ID of the brass bonnet 3 and assemble the adapter 23 over and silver solder it to the other (outer end of the stainless steel tube 18 as indicated at 24.

Sealing the packing space

The packing space between the inner stainless steel stem extension 12 and the outer surrounding brass adapter 23 may be conventionally sealed with suitable packing material which is axially pressed into its operative position by inserting the original packing ring 8 into the outer end of the bore of the adapter 23 and then threading the original packing nut 7 over the outer end of the periphery of the adapter 23.

Advantages of method

My preferred method reduces the cost of the conversion and provides a conversion product of high quality. It reduces the cost because it permits the use of stainless steel rods and tubes in commercially available diameters without requiring extensive stainless steel machining or other difficult stainless steel processing operations. Thus, stainless steel rods and tubes are commercially available in sizes which can be used without substantial change in extending the valve stems and bonnets of commercially available brass valves. The conversion product is of high quality because stainless steel rods do not readily twist at low torques; hence, normally enable the extended valve stem assembly to function rigidly and properly.

MODIFICATION

In place of the cylindrical mortise-and-tenon joint illustrated in FIG. 2, my invention contemplates the use of a mortise and tenon joint of the transverse tongue-and-groove type shown in FIG. 3. In this modification, the joint (provided by the tongue 26 in the end face of stem remnant 6a and the tongue-receiving groove in the inner end face of stem extension 12) may extend across the full diameter of the stem or, if desired, part way across the stem diameter.

Having described my invention, I claim:

1. In the art of converting a brass pressure-rated valve, such as gate or globe valve, into a cryogenic valve by providing the stem and bonnet elements of the brass valve with stainless steel extensions, an improved method of effecting the conversion after removing the brass packing nut and ring, comprising:
   (A) severing the outer projecting end portion of the brass valve stem adjacent the mouth of the brass bonnet;
   (B) extending the remnant of the brass valve stem by
      (1) providing a stem extension in the form of a solid stainless steel rod of requisite length, having inner and outer ends, and
      (2) assembling and securing the inner end of the stainless rod to the outer end of the brass stem remnant;
   (C) extending the brass valve bonnet by
      (1) providing a bonnet extension in the form of a hollow stainless steel tube of requisite length having an OD corresponding to the ID of the brass bonnet,
      (2) inserting one end of the stainless tube into and securing it to the brass bonnet,
      (3) providing an externally threaded brass bonnet adapter having an ID corresponding to the ID of the brass bonnet, and
      (4) assembling the adapter over and securing it to the other end of the stainless tube; and
   (D) sealing the packing space between the stainless rod and the brass adapter with a packing ring and nut.

2. The method of claim 1 wherein:
   (A) the performance of the stem remnant extension step includes providing a stem extension having an OD substantially the same as the OD of said stem remnant.

3. The method of claim 1 wherein:
   (A) the performance of the stem remnant extension step includes
      (1) providing the stem remnant with one element of a mortise-tenon joint,
      (2) providing the stem extension with the other element of said mortise-tenon joint, and
      (3) assembling the mortise and tenon ends of the said stem remnant and stem extension together.

4. The method of claim 3 wherein:
   (A) the performance of the stem remnant extension step includes
      (1) drilling said mortise element of said joint axially into the end face of the stem remnant,
      (2) providing the tenon element of said joint on the inner end of said stem extension and
      (3) inserting said tenon into said mortise during the operation of assembling and securing the stem extension to the stem remnant.

5. The method of claim 4 wherein:
   (A) the performance of the stem remnant extension step includes (1) providing said stem remnant with an observation passageway extending from the inner end portion of the mortise to the periphery of the stem remnant.
6. The method of claim 3 wherein:
(A) the performance of the stem remnant extension step includes
   (1) providing the end face of the stem remnant with said tenon element in the form of a tongue, and
   (2) providing the inner end of the stem extension with said mortise element in the form of a tongue-receiving groove.

References Cited
UNITED STATES PATENTS

| | | | |
|---|---|---|---|
| 3,032,310 | 5/1962 | Hansen | 251—327 |
| 3,322,143 | 5/1967 | Buschow | 137—375 |
| 3,418,708 | 12/1968 | Siver | 29—157.1 |

JOHN F. CAMPBELL, Primary Examiner

V. A. DIPALMA, Assistant Examiner

U.S. Cl. X.R.

137—375; 251—368